Nov. 23, 1965   R. M. DAVIS ET AL   3,219,905
METHOD OF OBTAINING ARTIFICIAL COMMUTATION OF AN INVERTER
Filed Sept. 10, 1962   2 Sheets-Sheet 1

United States Patent Office 3,219,905
Patented Nov. 23, 1965

3,219,905
METHOD OF OBTAINING ARTIFICIAL COMMUTATION OF AN INVERTER
Rex M. Davis and Christopher D. Clarke, Loughborough, England, assignors to Brush Electrical Engineering Company Limited, Loughborough, England
Filed Sept. 10, 1962, Ser. No. 222,428
4 Claims. (Cl. 321—8)

The invention relates to a method of obtaining artificial commutation of an electronic inverter. It is well-known that a capacitor may be used to impress a reverse voltage on an inverter element, such as a thyratron, mercury arc tube, or a silicon controlled rectifier, to extinguish it, the reverse voltage pulse being caused by firing the subsequent inverter element. Where the inverter is a single phase one having two elements it requires one such capacitor, but in the case of a three phase bridge inverter it is necessary to employ three commutating capacitors. An object of the invention is to enable only one commutating capacitor to be used regardless of the number of phases involved, so that a poly phase inverter is able to employ a single commutating capacitor of lower value than the aggregate capacitance of the commutating capacitors hitherto used.

According to the invention an artificially commutated electronic inverter includes an inverter circuit and a commutating circuit which latter comprises a bridge circuit connected in parallel with the inverter and between the latter and the normal smoothing choke, the bridge circuit having four switching elements of which each pair of diagonally-opposite elements are adapted to be switched alternatively in circuit with a condenser arranged between them. The bridge elements can be thyratrons mercury arc tubes, silicon controlled rectifiers, or transistors.

Thus, one capacitor is used on the D.C. side of the inverter, instead of using one or more capacitors on the A.C. side in accordance with previous practice.

The operation of the bridge circuit is adequate for a purely resistive load (i.e., one which is incapable of producing any voltage across itself) because a reverse voltage appears across the inverter elements to be extinguished as the capacitor charging current decays.

Inductive loads, however, are capable of producing voltages across themselves depending on the rate of change of the load current. Therefore, during the operation of the commutating circuit, which is attempting to break the current flow through the inverter elements and, therefore, through the inductive load as well, although the reverse voltage pulse is applied to the D.C. terminals of the inverter it is, unless the commutating capacitor is uneconomically large, cancelled by the self-induced voltage across the load. The inductive load therefore prevents the applied reverse voltage pulse from appearing across the inverter elements, with the result that they are not extinguished.

Moreover, even if use is made of diodes (i.e., devices which within their operating conditions present a resistance in one direction several orders of magnitude less than that in the reverse direction) to limit the magnitude of the self-induced voltages appearing across an inductive load, at least a portion of it will appear across the inverter terminals in opposition to the reverse voltage pulse produced by the commutating circuit so that the latter will be ineffective unless the said reverse voltage pulse is of a sufficiently large amplitude.

According to a further feature, therefore, an artificially commutated electronic inverter, for supplying an inductive load associated with diodes for limiting its self-induced voltage, includes an inverter circuit and a commutating circuit which latter comprises a bridge circuit connected in parallel with the inverter and between the latter and the normal smoothing choke, the bridge circuit having four switching elements of which each pair of diagonally-opposite elements are adapted to be switched alternately in circuit with a condenser arranged between them, and the amplitude of the reverse voltage pulse generated by the commutating capacitor is increased by applying an auxiliary D.C. voltage to the bridge.

The invention will now be described in greater detail with reference to the accompanying drawings, in which.

Figure 3:
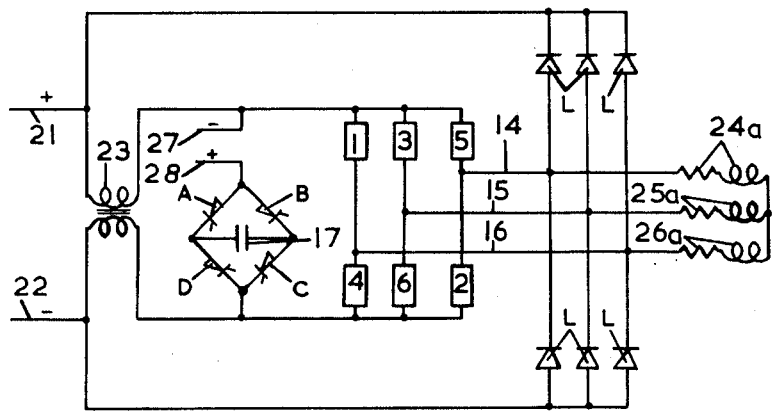
Figure 4:
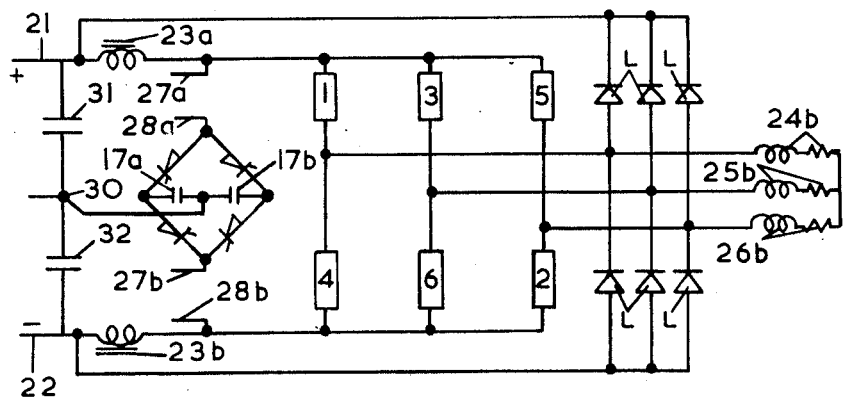

FIGURE 3 shows a bridge inverter associated with a commutating circuit for an inverter for supplying an inductive load and having provision for increasing the amplitude of the reverse voltage pulse; and FIGURE 4 shows the use of a bridge commutating circuit, with two auxiliary D.C. supplies, for commutating a three phase bridge inverter supplying an inductive three phase load associated with limiter diodes.

Figure 1:
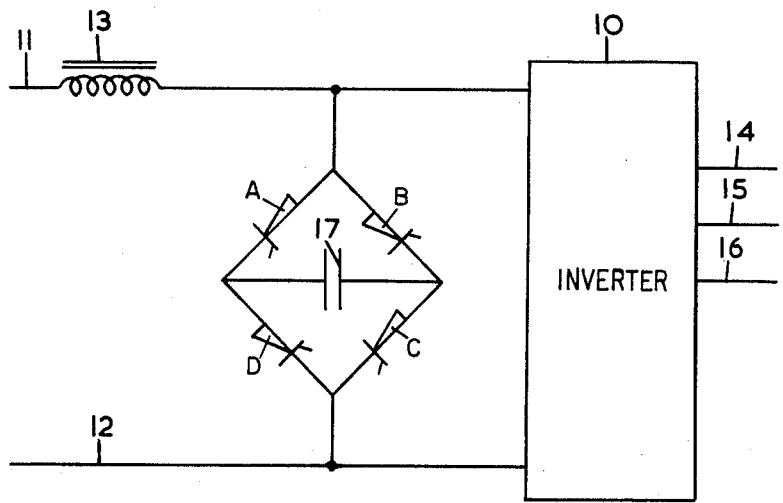
FIGURE 1 is a diagram of a circuit for use when the load is non-inductive in character.

Referring first to FIGURE 1, the inverter is indicated at 10, the D.C. supply lines at 11, 12 and the normal smoothing choke at 13. The inverter shown is a three phase one of which the output is indicated at 14, 15 and 16.

In accordance with the invention there is connected between the inverter and choke 13 a bridge circuit including four switching elements A, B, C, D and a capacitor 17. As previously stated, these elements can be thyratrons, mercury arc tubes, silicon controlled rectifiers, or transistors.

At starting, the capacitor bridge is charged to the peak D.C. voltage across the inverter through the pair of elements A and C, which subsequently extinguish themselves when the charging current decays. The D.C. supply will then be feeding the inverter only.

To commutate the inverter, elements B and D are switched on, and this connects the capacitor in reverse across the inverter thereby reversing the polarity of the D.C. voltage across it. This reversal of polarity allows the main inverter elements to regain their blocking condition before the voltage returns to its normal polarity.

The next sequence of the inverter conduction can now be chosen at will, after which the load current will be diverted from the capacitor back into the inverter, and the elements B and D will extinguish when the capacitor charging current decays. Thus, the capacitor has now been charged to the peak D.C. supply voltage, but this time with an opposite polarity to that obtained previously. The firing of switching elements A and C will therefore cause another reversal of voltage at the D.C. terminals of the inverter, and hence another commutation. A commutation occurs every time a pair of switching elements is fired.

The commutating capacitor 17 operates at every commutation of the inverter, and the bridge only handles the load current during the commutation interval and can therefore be short time rated.

Figure 2:
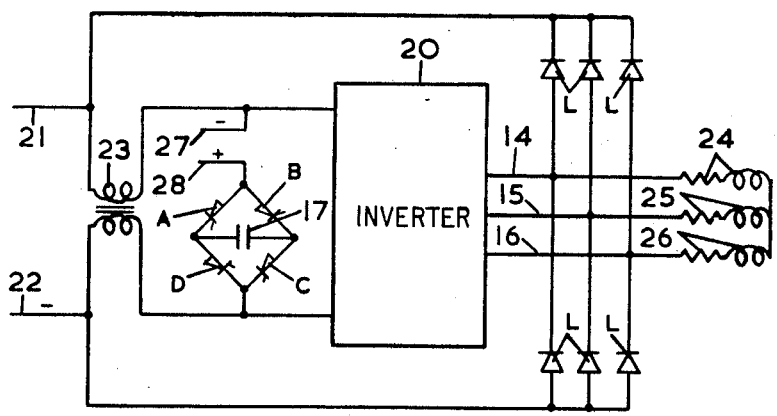
FIGURE 2 shows one method of connecting the auxiliary voltage to the commutating circuit to increase the amplitude of the reverse voltage pulse applied to the D.C. side of an inverter supplying an inductive load.

In FIGURE 2 the inverter is indicated at 20, the main D.C. supply lines at 21, 22 and the normal smoothing choke at 23 with one winding in each D.C. supply line to the inverter. The inverter shown is a three phase one of which the output is indicated at 14, 15 and 16. The three phase load 24, 25 and 26 is an inductive one associated with the limiter diodes L, and an auxiliary D.C. supply has one line 27 connected to main D.C. supply line 21 at a position intermediate the choke 23 and the inverter 20, and the other line 28 connected through a commutating capacitor bridge to the other main D.C. supply line 22 at a position intermediate the choke 23 and the inverter 20. The commutating capacitor bridge comprises four switches elements A, B, C, D and a capacitor 17, and the arrangement functions in the same way as described with reference to FIGURE 1, with the exception that the auxiliary D.C. supply enables the reverse pulses from the commutating bridge to extinguish the elements of the inverter in spite of the self-induced voltages of the inductive load.

FIGURE 3 shows the arrangement of six elements, denominated 1 to 6, of a three phase bridge inverter for a three phase load 24a, 25a, 26a.

The term "bridge inverter" as herein used is one in which the D.C. is fed from one terminal of the D.C. supply, firstly through one or more of several switching elements, secondly through one or more sections of the load and thirdly through one or more of several more switching elements back to the other terminal of the D.C. supply. Control means, which are not shown, are arranged to make the inverter elements conductive in pairs in the following order 1+2, 2+3, 3+4, 4+5, 5+6, 6+1, repeated, to establish the circuit between the D.C. supply 21 and 22 and the load such that three correctly phased alternating voltages are applied to the load, the commutating circuit being operated at the end of the conducting state of each pair of inverter elements to render at least one of them non-conducting prior to the control means rendering the next pair conducting. If the load is a non-inductive one, the commutating circuit need not be provided with an auxiliary D.C. supply but, if the load is an inductive one associated with limiting diodes L, the commutating circuit will be supplied with an auxiliary D.C. supply in the manner of FIGURE 2.

A bridge inverter has certain advantages over other forms, particularly that there is no D.C. component present in the load current. The bridge inverter, when commutated from the D.C. side according to the invention also has particular requirements to ensure satisfactory commutation. The commutation circuit, as described above, impresses a reverse voltage pulse on the D.C. terminals of the inverter. When the inverter takes the form of a bridge with limiting diodes connected to an inductive load, at least a portion of the reverse pulse from the commutating circuit is applied to both conducting inverter elements connected in series, the self-induced voltage across the load being limited by the diodes. The first of the two inverter elements to reach the extinguished or non-conducting state will immediately accept across itself the beneficial reverse voltage and deprive the other inverter element of the said beneficial reverse voltage, thus retarding the extinguishing process of the said other inverter element.

To obtain the most rapid extinguishing of both inverter elements it is therefore necessary to supply each inverter element individually with a reverse voltage commutating pulse, rather than via the other. This can best be achieved either by a balanced commutating circuit or by two separate commutating circutis operated simultaneously, one to provide a reverse voltage pulse to one D.C. terminal of the inverter relative to a neutral or mid-point of the D.C. supply, the other to provide a reverse voltage pulse to the other D.C. terminal of the inverter relative to the same neutral.

FIGURE 4 shows, by way of example, how the bridge commutating circuit with two auxiliary supplies 27a, 28a and 27b, 28b can be used to commutate a three phase bridge inverter comprising inverter elements 1 to 6, with limiter diodes L, supplying an inductive three phase load 24b, 25b, 26b. The commutating capacitor has been split into two series connected capacitors 17a, 17b, to achieve the balanced operation, the mid-point of the capacitors being connected to the mid-point or neutral 30 of the D.C. supply 21, 22. The mid-point or neutral 30 of the D.C. supply must be of low pulse impedance relative to the two main D.C. terminals, and if not inherently so, must be rendered so by two capacitors 31 and 32 connected as shown. The smoothing choke must also be provided with two isolated windings, or must take the form of two separate chokes 23a, 23b arranged between each main D.C. supply terminal and the commutating circuit to prevent the latter applying even a temporary short-circuit between either main D.C. supply terminal and the mid-point or neutral 30.

What we claim as our invention and desire to secure by Letters Patent of the United States is:

1. An artifically commutated electronic inverter for converting direct current into a polyphase alternating current, said inverter including an inverter circuit and a commutating circuit, said inverter circuit including a plurality of inverter elements, each inverter element requiring a reverse voltage to be impressed on it in order to extinguish it, said commutating circuit comprising a bridge circuit having four switching elements and a capacitor which is connected between two opposite terminals of the bridge circuit, means adapted to apply a control signal alternately to each pair of diagonally-opposite switching elements to render them conducting whereby to cause an alternating current to flow in the capacitor and a momentary reversal of polarity to occur at the other two opposite terminals of the bridge whenever a pair of the switching elements is rendered conducting, a smoothing choke arranged in the direct current lines to the inverter, and said other two opposite terminals of the bridge circuit connected in parallel with the inverter circuit between the latter and the smoothing choke whereby each said momentary reversal of polarity will be applied to extinguish at least one inverter element.

2. An artificially commutated electronic inverter for converting direct current into a polyphase alternating current to be supplied to an inductive load having diodes for limiting its self-induced voltage, said inverter including an inverter circuit and a commutating circuit, said inverter circuit including a plurality of inverter elements, each inverter element requiring a reverse voltage to be impressed on it in order to extinguish it, said commutating circuit comprising a bridge circuit having four switching elements and a capacitor which is connected between two opposite terminals of the bridge circuit, means adapted to apply a control signal alternately to each pair of diagonally-opposite switching elements to render them conducting whereby to cause an alternating current to flow in the capacitor and a momentary reversal of polarity to occur at the other two opposite terminals of the bridge whenever a pair of the switching elements is rendered conducting, a smoothing choke arranged in the direct current lines to the inverter, said other two opposite terminals of the bridge circuit connected in parallel with the inverter circuit between the latter and the smoothing choke so that each said momentary reversal of polarity will be applied to extinguish at least one inverter element, and an auxiliary direct current voltage source is connected in series with the bridge circuit whereby the amplitude of the said momentary reversal of polarity will be increased.

3. An artificially commutated electronic inverter, as in claim 2, in which two auixliary direct current voltage sources are provided and are arranged one on each side of the bridge circuit and in series therewith.

4. An artificially commutated electronic inverter for converting direct current into a polyphase alternating current to be supplied to an inductive load having diodes for limiting its self-induced voltage, said inverter including an inverter circuit and a commutating circuit, said inverter circuit including a plurality of inverter elements of which at elast one pair are connected in series when conducting, each inverter element requiring a reverse voltage to be impressed on it in order to extinguish it, said commutating circuit comprising a bridge circuit having four switching elements and two capacitors which are connected in series between two opposite terminals of the bridge circuit, means adapted to apply a control signal alternately to each pair of diagonally-opposite switching elements to render them conducting whereby to cause an alternating current to flow in the capacitors and a momentary reversal of polarity to occur at the other two opposite terminals of the bridge whenever a pair of the switching elements is rendered conducting, a smoothing choke has its inductance equally divided between two windings, one of said windings is arranged in the positive direct current line to the inverter and the other said winding is arranged in the negative direct current line to the inverter, said other two opposite terminals of the bridge circuit connected in parallel with the inverter circuit between the latter and said windings of the smoothing choke, two auxiliary voltage sources arranged one on each side of the bridge circuit and in series therewith, and the common terminal of the two capacitors is connected to a point whose capacitance to each of the direct current lines is large compared with the capacitance of the two commutating capacitors whereby each inverter element of said pair is independently supplied with a reverse commutating pulse.

References Cited by the Examiner

UNITED STATES PATENTS

| 2,644,126 | 6/1953 | Levy | 323—75 |
| 3,109,977 | 11/1963 | Redfern | 321—44 |
| 3,118,105 | 1/1964 | Relation et al. | 321—45 |

FOREIGN PATENTS

| 1,311,479 | 10/1962 | France. |
| 953,940 | 4/1964 | Great Britain. |

MILTON O. HIRSHFIELD, *Primary Examiner.*

LLOYD McCOLLUM, *Examiner.*